US012541573B2

(12) United States Patent
Settle et al.

(10) Patent No.: US 12,541,573 B2
(45) Date of Patent: Feb. 3, 2026

(54) EVENT PATTERN PREDICTION

(71) Applicant: INTERNATIONAL BUSINESS MACHINES CORPORATION, Armonk, NY (US)

(72) Inventors: Jonathan Ian Settle, Dursley (GB); Fred Harald Klein, Berlin (DE); Zane Clayton Bray, London (GB); Isabell Sippli, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 18/068,677

(22) Filed: Dec. 20, 2022

(65) Prior Publication Data

US 2024/0202286 A1 Jun. 20, 2024

(51) Int. Cl.
*G06F 18/2415* (2023.01)
*G06F 9/38* (2018.01)

(52) U.S. Cl.
CPC ........ *G06F 18/2415* (2023.01); *G06F 9/3848* (2013.01)

(58) Field of Classification Search
None
See application file for complete search history.

(56) References Cited

U.S. PATENT DOCUMENTS

| | | | |
|---|---|---|---|
| 6,718,317 B1 * | 4/2004 | Wang | G06F 18/00 706/50 |
| 9,171,282 B2 | 10/2015 | Yalamanchi | |
| 9,652,316 B2 | 5/2017 | Gamage | |
| 10,375,135 B2 | 8/2019 | Lee | |

(Continued)

FOREIGN PATENT DOCUMENTS

| | | |
|---|---|---|
| CN | 118228092 A | 6/2024 |
| EP | 3128466 A1 | 2/2017 |

(Continued)

OTHER PUBLICATIONS

Etzion, O., "Event Pattern Detection", In: Liu L., Özsu M.T. (eds) Encyclopedia of Database Systems. Springer, Boston, MA, Downloaded from the Internet on Apr. 5, 2022, 4 pgs., <https://doi.org/10.1007/978-0-387-39940-9_574>.

(Continued)

*Primary Examiner* — Lina Cordero
(74) *Attorney, Agent, or Firm* — Scott Dobson

(57) ABSTRACT

Predicting the formation of event groups in complex and enterprise-related information technology (IT) environments is provided. In some instances, an event pattern is predicted based upon events arriving within a duration that matches a historical pattern for an event and surpasses a user-defined threshold of events that are received. This predicted event pattern is used to monitor incoming events in order to alert an operator or site reliability engineer (SRE) that a certain percentage of events from the predicted pattern are received. In another instance, receiving an event automatically triggers the formation of an event group, with the event group having information relating to the received event and a series of placeholder events. As more events are received, these newly received events individually replace the placeholder events in the event group.

25 Claims, 5 Drawing Sheets

(56) References Cited

U.S. PATENT DOCUMENTS

| | | | | |
|---|---|---|---|---|
| 2005/0080806 | A1* | 4/2005 | Doganata | G06F 11/2257 |
| | | | | 707/999.102 |
| 2014/0365524 | A1 | 12/2014 | Hirzel | |
| 2016/0292028 | A1* | 10/2016 | Gamage | G06F 9/542 |
| 2017/0242740 | A1* | 8/2017 | Bell | G06F 40/174 |
| 2017/0337096 | A1* | 11/2017 | Charters | G06F 11/0751 |
| 2017/0364660 | A1 | 12/2017 | Vigersky | |
| 2018/0157983 | A1* | 6/2018 | Guruswamappa | G06F 11/3466 |
| 2019/0327127 | A1 | 10/2019 | Bergstein | |
| 2021/0096919 | A1 | 4/2021 | Rajendran | |
| 2024/0020216 | A1* | 1/2024 | Ableidinger | G06F 11/3466 |

FOREIGN PATENT DOCUMENTS

| | | |
|---|---|---|
| IN | 202041003636 A | 7/2021 |
| JP | 2024-088591 A | 7/2024 |

OTHER PUBLICATIONS

Qadah, et al., "A Distributed Online Learning Approach for Pattern Prediction over Movement Event Streams with Apache Flink", Published in the Workshop Proceedings of the EDBT/ICDT 2018 Joint Conference, Mar. 26, 2018, Vienna, Austria, 8 pgs.

Wu, et al., "WNN-Based Fast Event Pattern Detection and Prediction Using Reversed Pattern Tree for Cloud System Reliability Management", 2015 IEEE 14th International Conference on Machine Learning and Applications, 2015, 6 pgs., doi: 10.1109/ICMLA.2015.194.

* cited by examiner

500

| NODE | SEVERITY | SUMMARY | EXPECTED | ALERT GROUP |
|---|---|---|---|---|
| GROUP | CRITICAL | NUM EVENTS: 1 | | GROUP EVENT |
| A | CRITICAL | POWER FAILURE | | POWER |
| B | INDETERMINATE | SERVER X HAS FAILED (80%) | 300 SECONDS | PLACEHOLDER |
| C | INDETERMINATE | SWITCH Y HAS FAILED (90%) | 90 SECONDS | PLACEHOLDER |
| D | INDETERMINATE | GSM SERVICE FAILURE (100%) | 300 SECONDS | PLACEHOLDER |
| E | INDETERMINATE | 3G SERVICE FAILURE (100%) | 100 SECONDS | PLACEHOLDER |

| NODE | SEVERITY | SUMMARY | EXPECTED | ALERT GROUP |
|---|---|---|---|---|
| GROUP | CRITICAL | NUM EVENTS: 3 | | GROUP EVENT |
| A | CRITICAL | POWER FAILURE | | POWER |
| B | INDETERMINATE | SERVER X HAS FAILED (80%) | 300 SECONDS | PLACEHOLDER |
| C | INDETERMINATE | SWITCH Y HAS FAILED (90%) | 90 SECONDS | SWITCH |
| D | INDETERMINATE | GSM SERVICE FAILURE (100%) | 300 SECONDS | PLACEHOLDER |
| E | INDETERMINATE | 3G SERVICE FAILURE (100%) | 100 SECONDS | SERVICE |

FIG. 6

EVENT PATTERN PREDICTION

BACKGROUND

The present invention is generally related to the field of event pattern prediction, and more specifically to utilizing event patterns for enterprise related solutions.

In complex telecommunication network or Information Technology (IT) environments, operations teams are tasked with keeping services up and running and increasing their availability. The goal for these operations teams is to increase communications and processing speed, reducing mean time to repair (MTTR), and reducing mean time between failure(s) (MTBF).

As used throughout this document, the term "events" represent potential problems that arise in these telecommunication and information technology (IT) infrastructures. It is the purpose of an event management system to help the operations team to identify those events on which an automated or manual action must occur (that is, a reparative or otherwise restorative action).

Grouping events helps to greatly reduce the amount of time taken to review the incoming messages. Instead of individual events, these groups are presented to operators or site reliability engineers (SREs). However, today such groupings are only presented if a full pattern has been detected, whereas incomplete patterns are not detected or presented to the end user.

SUMMARY

According to an aspect of the present invention, there is a method, computer program product and/or system that performs the following operations (not necessarily in the following order): (i) providing, by an event management solution module, an historical pattern data set, with the historical pattern data set including information indicative of: (a) a number of historical events detected in an historical occurrence, and (b) a duration of the historical occurrence; (ii) receiving, by an event management solution module, a set of events, with the set of events being a set of potential problems experienced by a given information technology (IT) environment; (iii) detecting, by the event management solution module, an event pattern based on the received set of events, with the event pattern being similar to the historical pattern data set; (iv) determining, by the event management solution module, a probability that a remaining set of events will arrive within a remainder of a first predicted period of time, with the remaining set of events being the difference between the number of historical events and the received set of events, and with the first predicted period of time being based, at least in part, upon the duration of the historical occurrence; and (v) responsive to the determination, alerting, by the event management solution module, an operator that the remaining set of events will arrive within the remainder of the first predicted period of time.

In some instances, this method is advantageous because it allows the operator to know well in advance (that is, prior to the ending of the defined duration) that certain problematic events will occur. This gives the operator ample time to address the events that are reliably predicted to occur within the duration.

According to an aspect of the present invention, there is a method, computer program product and/or system that performs the following operations (not necessarily in the following order): (i) receiving, by an event management solution module, a first event, with the reception of the first event triggering the formation of a first event group, and with the first event group including a plurality of potential events including the first event; (ii) creating, by the event management solution module, a placeholder event for each potential event of the plurality of potential events; (iii) receiving, by the event management solution module, a second event; (iv) responsive to the receipt of the second event, replacing the placeholder event with the second event; and (v) providing an operator with an alert that the second event has replaced the placeholder event.

In some instances, this method is advantageous because it allows an operator to have a better understanding of how to deal with various problematic events well before those events arrive. For example, once the event group is formed, the operator has a general sense of the severity of the incoming events as well as an estimated time frame for the arrival of those same events. This also gives the operator ample time to prepare for the events that are reliably predicted to occur within the duration.

BRIEF DESCRIPTION OF THE DRAWINGS

FIG. 5 is a first table showing information that is helpful in understanding embodiments of the present invention; and FIG. 6 is a second table showing information that his helpful in understanding embodiments of the present invention.

DETAILED DESCRIPTION

Figure 1:
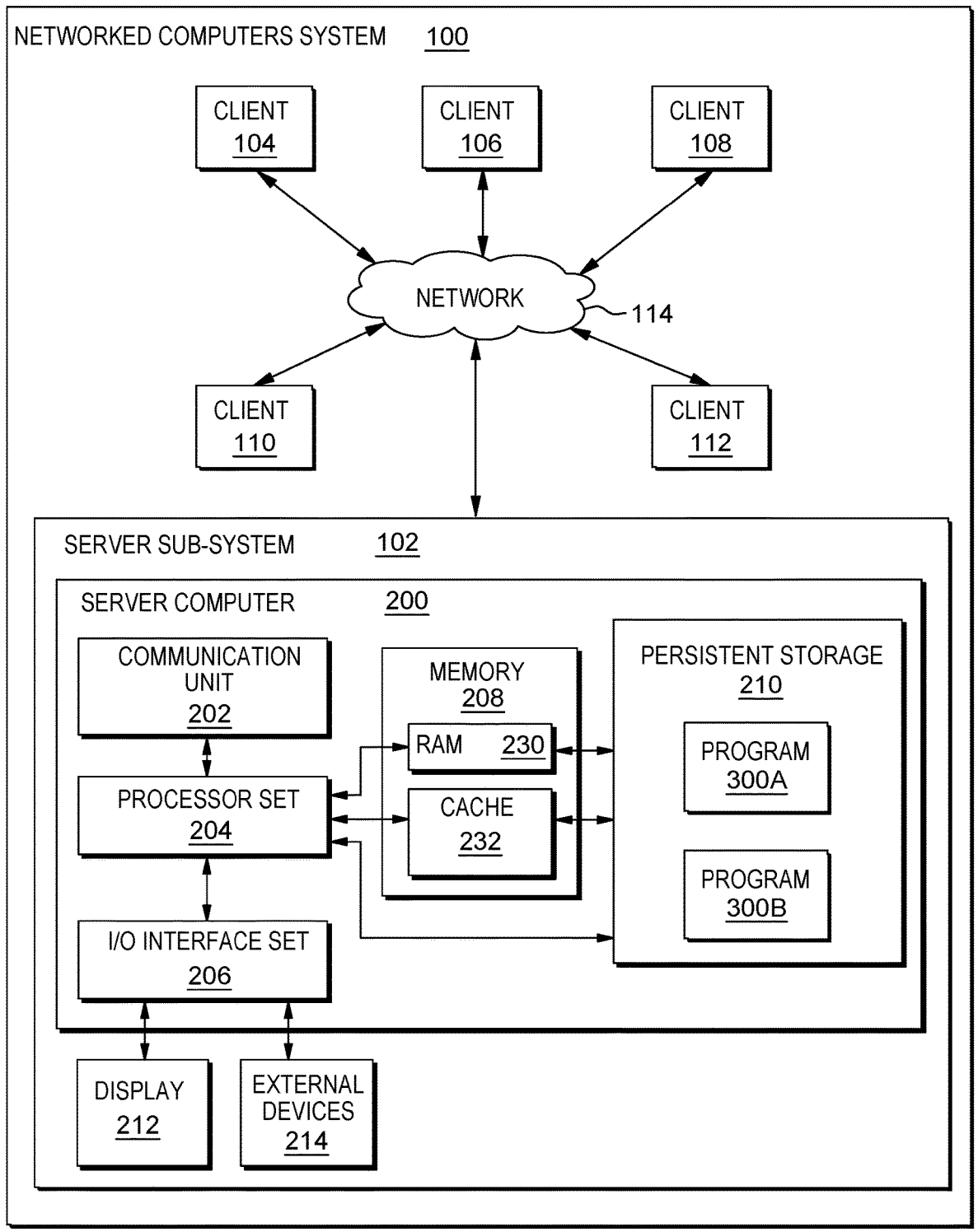
FIG. 1 is a block diagram view of a first embodiment of a system according to the present invention.

Some embodiments of the present invention are directed towards predicting the formation of event groups in complex and enterprise-related information technology (IT) environments. In some instances, an event pattern is predicted based upon events arriving within a duration that matches a historical pattern for an event and surpasses a user-defined threshold of events that are received. This predicted event pattern is used to monitor incoming events in order to alert an operator or site reliability engineer (SRE) that a certain percentage of events from the predicted pattern are received. In another instance, receiving an event automatically triggers the formation of an event group, with the event group having information relating to the received event and a series of placeholder events. As more events are received, these newly received events individually replace the placeholder events in the event group.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208;

persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300a and Program 300b are stored in persistent storage 210 for access and/or execution by one or more of the respective computer processors 204, usually through one or more memories of memory 208. Persistent storage 210: (i) is at least more persistent than a signal in transit; (ii) stores the programs (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300a and Program 300b may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
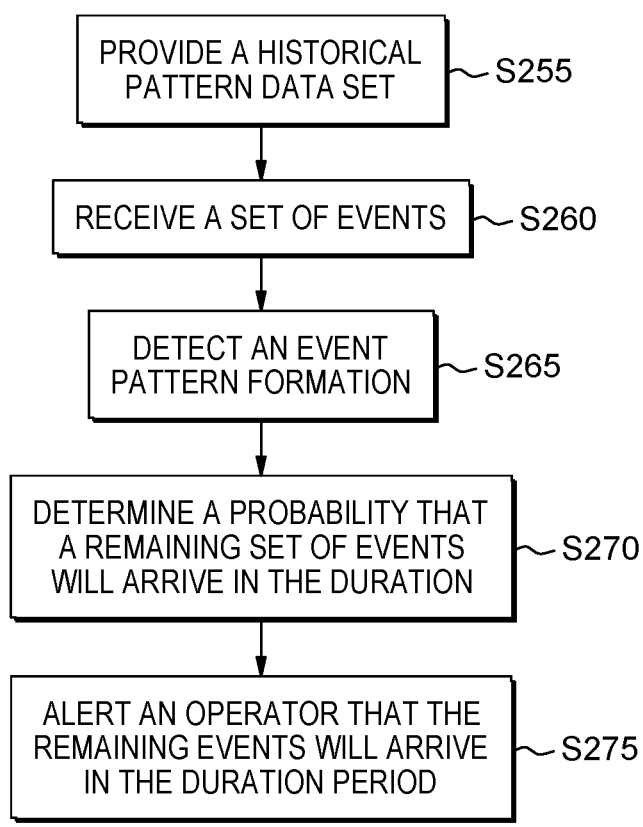
FIG. 2 is a flowchart showing a first embodiment method performed, at least in part, by the first embodiment system.
Figure 3A:
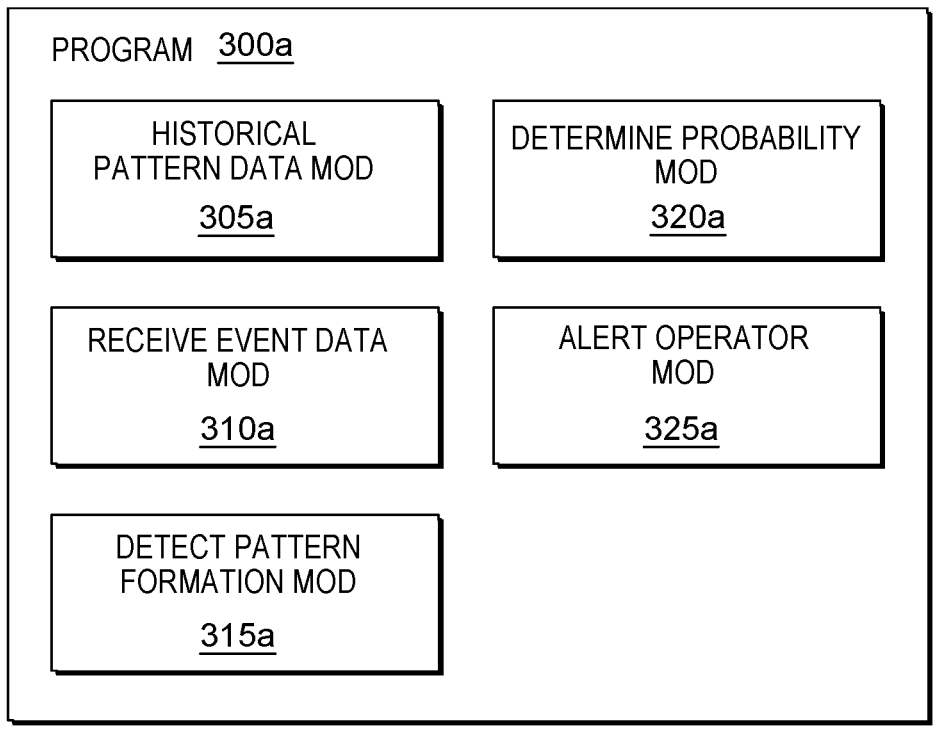
FIG. 3a is a block diagram showing a machine logic (for example, software) portion of the first embodiment system.

FIG. 2 shows flowchart 250 depicting a first method according to the present invention. FIG. 3a shows program 300a for performing at least some of the method operations of flowchart 250. This method and associated software will now be discussed, over the course of the following paragraphs, with extensive reference to FIG. 2 (for the method operation blocks) and FIG. 3a (for the software blocks).

Processing begins at operation S255, where historical pattern data mod 305a provides an historical pattern data set. In some embodiments of the present invention, the historical pattern data set includes data relating to multiple event patterns that have occurred in the past. More specifically, the historical pattern data set includes: (i) information that relates to a number of events that are detected in a given historical pattern; and (ii) a duration for each given historical pattern. In some embodiments, the duration is the average amount of time between the arrival of a first event in a given historical pattern and the arrival of the last event in the given historical pattern.

Processing proceeds to operation S260, where receive event data mod 310a receives a set of events, or event data. In some embodiments, the set of "events" received by mod 310a represents problematic instances in a given information technology (IT) environment. For example, an event can include, but is not necessarily limited to the following: power failure, server failure, switch failure, service interruption, and network failure and/or network interruption.

Processing proceeds to operation S265, where detect pattern formation mod 315a detects an event pattern formation. In this example, an event pattern formation is a set of events indicative of the occurrence of future events, the complete set of events arising together as a cluster of events. In some embodiments, mod 315a detects an event pattern formation by comparing the events that are being received by receive event data mod 310a (discussed in connection with operation S260, above) to the historical pattern data set (discussed in connection with operation S255, above). In some embodiments, detect pattern formation mod 315a does not necessarily need to make an exact pattern match in order for an event pattern formation to be detected. A pattern can be detected based on various factors, including the order in which different events arrive, the duration of a given occurrence, the number of events that are detected during the duration, etc. It is important to note that while the order of the arrival of events can be an important factor in detecting that a particular event pattern is currently being formed, the order of the arrival of the events itself is not determinative of a new pattern. Rather, it is the totality of the factors (such as events arriving within a particular duration) that is determinative of a newly detected pattern.

Processing proceeds to operation S270, where determine probability mod 320a determines a probability that a remaining set of events will arrive within the duration. Consider the following example: The total set of events that are to be detected in an event group is five (5), and the duration for this event group is two (2) hours. In one instance, two events are received by mod 310a (as discussed in connection with operation S260, above) within the first thirty (30) minutes of the duration. Then, fifteen (15) minutes later, a third event is received. At this point, since more than half of the expected events have arrived, the percentage of events that are received (sometimes herein referred to as a "completeness level") can be used to calculate the probability that the remaining two (2) events will arrive within the duration window (sometimes herein referred to as a "firing probability"). In this particular example, the firing probability is sixty percent (60%), meaning that there is a 60% likelihood that the remaining two events will arrive within the two-hour duration window. It is important to note that the firing probability can be calculated when even one event is received; however, that probability is not necessarily as meaningful to an operator compared to a probability calculated when a majority of events are received.

Processing finally proceeds to operation S275, where alert operator mod 325a sends an alert notification to an operator that the remaining set of events will arrive within the duration period. In some embodiments of the present invention, an operator or site reliability engineer (SRE) that is utilizing the given IT infrastructure can set a threshold of events that are received. That is the operator or SRE can pre-determine what completeness level must exist before receiving an alert regarding the remaining events that are yet to be received.

Figure 3B:
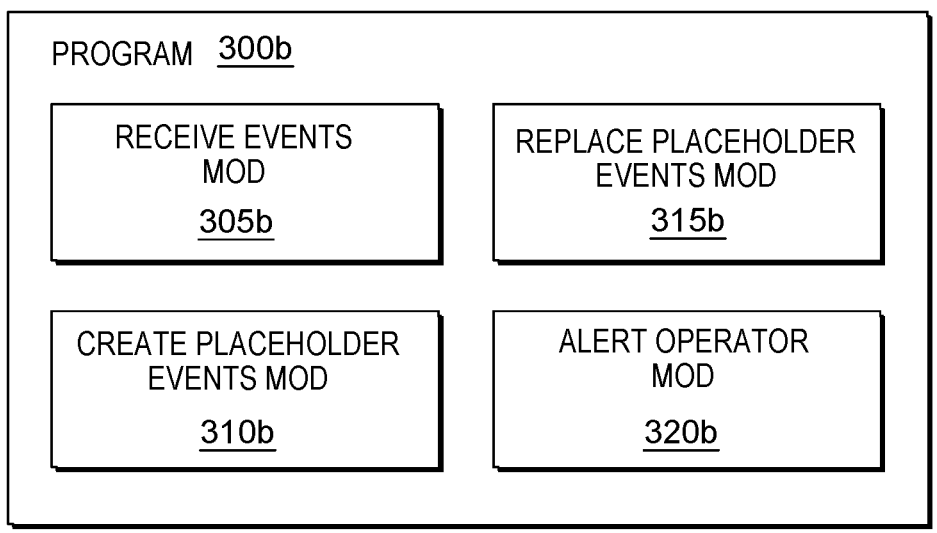
FIG. 3b is a block diagram showing a machine logic (for example, software) portion of the first embodiment system.
Figure 4:
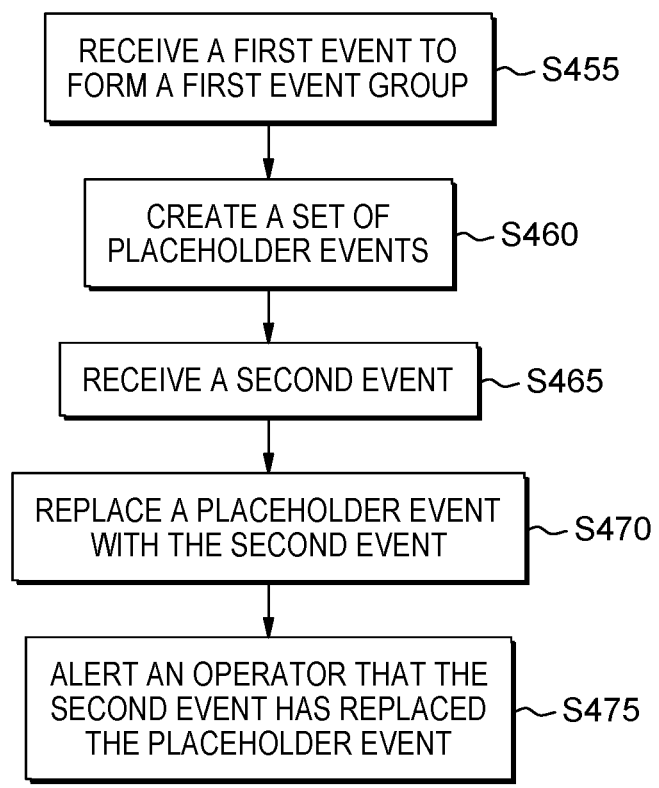
FIG. 4 is a flowchart showing a second embodiment method performed, at least in part, by the first embodiment system.

Now referring to a second method according to the present invention, FIG. 4 shows flowchart 450 depicting a second method according to the present invention. FIG. 3b shows program 300b for performing at least some of the method operations of flowchart 450. This method and associated software will now be discussed, over the course of the following paragraphs, with extensive reference to FIG. 4 (for the method operation blocks) and FIG. 3b (for the software blocks).

Processing begins at operation S455, where receive events mod 305b receives a first event, where the reception of the first event automatically creates the formation of a first event group. As mentioned earlier in this discussion (in connection with operation S260 of flowchart 250), the first "event" that is received by mod 305b represents a single problematic instance in a particular IT environment (such as a power failure, switch failure, communications network interruption, etc.). With respect to the method of flowchart 450, receiving the first event by mod 305b automatically creates a first event group. That is, with respect to this method, it is not necessary for multiple events to arrive in order to detect an event pattern formation before making determinations about the likelihood of future events arriving. Rather, in lieu of recognizing a pattern, receiving a first event creates an event group that includes several "placeholder" events (discussed in greater detail in connection with operation S460, below).

Processing proceeds to operation S460, where create placeholder events mod 310b creates a set of placeholder events. As mentioned above in connection with operation S455, receiving the first event by mod 305b automatically creates a first event group, with the first event group including at least one placeholder event. However, in most embodiments, an event group with several placeholder events is created. An example of this type of event group formation is shown in table 600 of FIG. 6. Each placeholder event in the newly-formed event group represents an event that is not yet received. Additionally, each placeholder event includes the following information: node (that is, the source of the event), severity of the event, summary of the event (such as "power failure"), expected arrival of the event (shown in time units), and expected likelihood of the event's arrival (shown as a percentage likelihood).

Processing proceeds to operation S465, where receive events mod 305b receives a second event. After receiving the second event, processing proceeds to operation S470, where replace placeholder events mod 315b replaces a placeholder event with the second event (discussed in connection with operation S465). In some embodiments, the information related to the placeholder event can be updated once the second event replaces the placeholder event (for example, the severity for the particular event that was originally thought to be "indeterminate" or "mild" can be properly changed to "severe" once the full breadth of the event and its impact is known).

Processing finally proceeds to operation S475, where alert operator mod 320b alerts an operator that the second event has replaced the placeholder event.

III. Further Comments and/or Embodiments

Embodiments of the present invention provide early identification of the recurrence of patterns of events and support for the grouping of events at an early stage of an ongoing event pattern. The early identification and grouping of events creates a predictive capability to help operations teams to be warned of an upcoming problematic event (such as a power or system outage) that may occur and to allow operations teams to take countermeasures to prevent the upcoming event from occurring.

Essentially, embodiments of the present invention use two attributes of an existing pattern's historical occurrences (number of events and duration), together with a live stream of events, to monitor the formation of emerging patterns of events and calculate the probability of subsequent pattern members arriving within a predicted timeframe.

This effectively allows embodiments of the present invention to predict the timing of an event occurrence before it happens and to alert operators of its likely appearance. For example, consider the set of events A to include events [a, b, c, d, e], and assume that the set of events A has been detected by the system as having occurred together within a recorded period of time, or for a known duration, in the past. Accordingly, the "duration" of the set of events can be defined as being the average amount of time between the arrival of the first event and the arrival of the last event in the previously observed occurrences of the set of events A. The order in which the set of events occurs, or in which they were received, in previous occurrences does not always matter. Instead, according to some embodiments of the present invention, it is the overall duration between the arrival of the first event and the arrival of the last event that is used for identifying event patterns and/or for predicting future events.

If the set of events A has been observed to have an average duration of one hour, when the events [a], [b], [c], and [d] (80% of the set A) are received in the first forty-five (45) minutes, there is another fifteen (15) minutes left in which event [e] is likely to occur. This percentage of events received for any given set is called the "completeness level." The percentage value of the completeness level relates to the probability that the remaining events in a given set of events will arrive in the remaining amount of time making up the average duration associated with the set of events, in this example, the remaining amount of time is fifteen (15) minutes.

In some embodiments, the completeness level is referred to as the "firing probability." The firing probability is used to alert users of the likelihood that the remaining events of a predicted ongoing set of events will arrive within a specified period of time, the overall duration predicted to be the average duration when the set of events has previously occurred.

In the example above, it can be stated that there is an 80% likelihood that event [e] will arrive in the next fifteen (15) minutes. This example is referred to as the "threshold approach."

An extension to the "threshold approach" would equally apply to finite sets of events as well as to sets of events that are defined by patterns. In this extended scenario, an event group is formed as soon as the first member of a finite group or group pattern occurs.

As well as displaying the newly grouped event, placeholder events are additionally created in the view, one for each member, and each placeholder event includes information indicating the probability that the event will occur. In some embodiments, this information is based on data held on previous occurrences of the finite group or pattern.

In some embodiments, a threshold is used to allow the operator administrator to specify the minimum threshold probability that has to be met before a placeholder event is created for each event. As the members subsequently arrive, they replace the placeholders. In this way, operators are both alerted to the developing scenario, as well as presented immediately with the likelihood that each of the underlying causes or symptoms will occur. This effectively provides an early-warning system that will predict incoming events, which would consequently enable operators to take action to avoid those outages.

Some embodiments of the present invention add the threshold concept to this extended approach. This allows for modification of the severity of the group (that is, the severity of the group can be changed to "critical" once 80% of all events have arrived).

Table 500 of FIG. 5 shows an example of the first event [A] arriving and the group being created with one real event [A] and the rest with placeholders. As shown in table 500, once event [A] is received, the "alert group" field is updated to show that the first event is an event related to power (as further indicated in the "summary" field).

Table 600 of FIG. 6 shows an example of the placeholders from table 500 being replaced and the group being updated. After a second event is received (such as event [C]), the alert group field for node "C" replaces the placeholder event with the actual event that has occurred. This process is repeated as additional events are received and continue to replace the placeholder events.

In some embodiments of the present invention, tables 500 and 600 illustrate what is referred to as the "placeholder approach." With the placeholder approach, embodiments of the present invention base its predictions on the re-occurrence of an existing pattern.

The suggested implementation cannot predict similar patterns at the moment. The solution may instead be extended to similar patterns.

A similar pattern has, for example, one more event than the existing patterns or one fewer. Alternatively or additionally, the difference can be calculated as a percentage (such as ten percent (10%) more events or fewer events). In some embodiments of the present invention, a threshold will be defined in terms of the firing probability. When this occurs, the operations team will be alerted. For example, in some embodiments, a warning alert is generated when eighty percent (80%) of the members have been received for any given event set. Alternatively, in some embodiments, a warning alert is generated for event set(s) that are similar to those described above in connection with FIGS. 5 and 6.

Some embodiments of the present invention provide a method for utilizing a "threshold approach" for event prediction. Operations of this method include the following (not necessarily in the following order): (i) receiving a new event by the event management solution; and (ii) searching, by the event management solution, to determine if any of the existing event patterns contain the event, or if there is a generalized pattern available that the event would apply two. In some embodiments, if at least one pattern is found, then one record per matching pattern(s) is created. Alternatively, a pattern is attached to an existing record that already contains a list of previously arrived events.

For each matching pattern, embodiments of the present invention perform at least the following operations (not necessarily in the following order): (i) count the number of already matched events from that pattern and relate it to the total number of events from that pattern; (ii) use this relation as a probability prediction that the pattern is currently developing; (iii) use the duration of that pattern to predict the time to outage; (iv) if the probability is above a certain level then create a pattern prediction event; and (v) if the probable pattern has expired before firing (crossed a given threshold) then delete the whole prediction.

Some embodiments of the present invention provide a method for utilizing a "placeholder approach" for event prediction. Operations of this method include the following (not necessarily in the following order): (i) receiving a new event by the event management solution; (ii) searching, by the event management solution, if the following conditions exist: (a) any of the existing event patterns contain the event, (b) if there is a generalized pattern available that the event would apply to, and/or (c) if there is a partially developed pattern where this event could replace a placeholder.

In some embodiments, if conditions (ii)(a) or (ii)(b) exist, and if at least one pattern is found, then a synthetic parent event is created for each given pattern. Alternatively, if conditions (ii)(a) or (ii)(b) exist, and if one pattern is found, then missing events are created as placeholders. In some embodiments, if condition (ii)(c) exists, then the matching placeholder event is replaced and/or the severity of the synthetic parent event is potentially increased.

In addition to the time window and the concrete events, embodiments of the present invention provide additional methods of generalizing an event pattern formation.

In some embodiments, events contain resource information, such as the nature of the event itself and/or where the event is originated. This type of resource information makes the events specific.

In one example, let us assume that the set of events A (referenced above in this Sub-Section) are all related to a database (such as DB_A) that is running on host "sample1.company.com."

Now, let us assume that another database (such as DB_B) of the same vendor and version running on host "sample2.company.com." Here, the pattern from DB_A would be likely be applicable to the DB_B as well.

The question still remains: how can users/operators/SREs detect a similarity between DB_A and DB_B, and thereby a high likelihood of the event pattern formation prediction to be correct?

To answer this question, it is important to analyze the topological information about DB_A and DB_B, as well as the event types (that is, the categories that the events can be classified as).

If the same pattern and path for DB_A and DB_B is detected, and the event types are the same, embodiments of the present invention can apply the prediction.

For example, if DB_A<runsOn>sample1.company.com, and that host is a virtual machine (VM), and DB_B<runsOn>sample2.company.com which is also a VM, then embodiments of the present invention can detect a match.

Additionally, with respect to the event types, embodiments of the present invention can auto classify them based on a natural language processing (NLP) analysis of the contained information and attribute a call to each event. Examples for these classes are: "Error", "Latency", "Saturation," etc.

If the events in the original pattern A match the types of events arriving for DB_B, then embodiments of the present invention can assume that there is a high likelihood of the same pattern emerging.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
providing, by an event management solution module, an historical pattern data set, with the historical pattern data set including information indicative of: (i) a number of historical events detected in an historical occurrence, and (ii) a duration of the historical occurrence;
receiving, by the event management solution module, a set of events, with the set of events being a set of potential problems experienced by a given information technology (IT) environment;
detecting, by the event management solution module, an event pattern based on the set of events, with the event pattern being similar to the historical pattern data set;
determining, by the event management solution module, a probability that a remaining set of events will arrive within a remainder of a first predicted period of time, with the remaining set of events being a difference between the number of historical events and the set of events, and with the first predicted period of time being based, at least in part, upon the duration of the historical occurrence; and
responsive to the determination, alerting, by the event management solution module, an operator that the remaining set of events will arrive within the remainder of the first predicted period of time.

2. The CIM of claim 1 further comprising:
setting, by the operator, a threshold value for the set of events, with the threshold value representing a completeness level of events that are received within the first predicted period of time.

3. The CIM of claim 1 wherein the duration of the historical occurrence represents an average amount of time between arrival of a first historical event and a last historical event of the historical occurrence.

4. The CIM of claim 1, wherein the event pattern is detected by comparing a first plurality of events that are received to the historical pattern data set.

5. The CIM of claim 1, wherein the event pattern is detected when the set of events that are received are less than the number of historical events in the historical occurrence.

6. A computer-implemented method (CIM) comprising:
receiving, by an event management solution module, a first event, with the reception of the first event triggering formation of a first event group, and with the first event group including a plurality of potential events including the first event;
creating, by the event management solution module, a placeholder event for each potential event of the plurality of potential events;
receiving, by the event management solution module, a second event;
responsive to the receipt of the second event, replacing the placeholder event with the second event; and
providing an operator with an alert that the second event has replaced the placeholder event.

7. The CIM of claim 6 further comprising:
creating, by the event management solution module, the first event group based, at least in part, upon a number of historical events detected in an historical occurrence.

8. The CIM of claim 6, wherein the first event group includes information indicative of an event summary for each event.

9. The CIM of claim 6, wherein a severity indication for the placeholder event is updated after replacing the placeholder event with a received event.

10. The CIM of claim 6 wherein the first event group includes information indicative of an expected amount of time that a given event will persist once the given event is detected.

11. A computer program product (CPP) comprising:
a computer-readable storage medium; and
computer code stored on the computer-readable storage medium, with the computer code including instructions and data for causing a processor set to perform operations comprising:
providing, by an event management solution module, an historical pattern data set, with the historical pattern data set including information indicative of: (i) a number of historical events detected in an historical occurrence, and (ii) a duration of the historical occurrence,
receiving, by the event management solution module, a set of events, with the set of events being a set of potential problems experienced by a given information technology (IT) environment,
detecting, by the event management solution module, an event pattern based on the set of events, with the event pattern being similar to the historical pattern data set,
determining, by the event management solution module, a probability that a remaining set of events will arrive within a remainder of a first predicted period of time, with the remaining set of events being a difference between the number of historical events and the set of events, and with the first predicted period of time being based, at least in part, upon the duration of the historical occurrence, and
responsive to the determination, alerting, by the event management solution module, an operator that the remaining set of events will arrive within the remainder of the first predicted period of time.

12. The CPP of claim 11 further comprising:
setting, by the operator, a threshold value for the set of events, with the threshold value representing a completeness level of events that are received within the first predicted period of time.

13. The CPP of claim 11 wherein the duration of the historical occurrence represents an average amount of time between arrival of a first historical event and a last historical event of the historical occurrence.

14. The CPP of claim 11 wherein the event pattern is detected by comparing a first plurality of events that are received to the historical pattern data set.

15. The CPP of claim 11 wherein the event pattern is detected when the set of events that are received are less than the number of historical events in the historical occurrence.

16. A computer program product (CPP) comprising:
a computer-readable storage medium; and
computer code stored on the computer-readable storage medium, with the computer code including instructions and data for causing a processor set to perform operations comprising:
receiving, by an event management solution module, a first event, with the reception of the first event triggering formation of a first event group, and with the first event group including a plurality of potential events including the first event,
creating, by the event management solution module, a placeholder event for each potential event of the plurality of potential events,
receiving, by the event management solution module, a second event,
responsive to the receipt of the second event, replacing the placeholder event with the second event, and
providing an operator with an alert that the second event has replaced the placeholder event.

17. The CPP of claim 16 further comprising:
creating, by the event management solution module, the first event group based, at least in part, upon a number of historical events detected in an historical occurrence.

18. The CPP of claim 16 wherein the first event group includes information indicative of an event summary for each event.

19. The CPP of claim 16 wherein a severity indication for the placeholder event is updated after replacing the placeholder event with a received event.

20. The CPP of claim 16 wherein the first event group includes information indicative of an expected amount of time that a given event will persist once the given event is detected.

21. A computer system (CS) comprising:
a processor set;
a computer-readable storage medium; and
computer code stored on the computer-readable storage medium, with the computer code including instructions and data for causing the processor set to perform operations comprising:
providing, by an event management solution module, an historical pattern data set, with the historical pattern data set including information indicative of: (i) a number of historical events detected in an historical occurrence, and (ii) a duration of the historical occurrence,
receiving, by the event management solution module, a set of events, with the set of events being a set of potential problems experienced by a given information technology (IT) environment,
detecting, by the event management solution module, an event pattern based on the set of events, with the event pattern being similar to the historical pattern data set,
determining, by the event management solution module, a probability that a remaining set of events will arrive within a remainder of a first predicted period of time, with the remaining set of events being a difference between the number of historical events and the set of events, and with the first predicted period of time being based, at least in part, upon the duration of the historical occurrence, and
responsive to the determination, alerting, by the event management solution module, an operator that the remaining set of events will arrive within the remainder of the first predicted period of time.

22. The CS of claim 21 further comprising:
setting, by the operator, a threshold value for the set of events, with the threshold value representing a completeness level of events that are received within the first predicted period of time.

23. The CS of claim 21 wherein the duration of the historical occurrence represents an average amount of time between arrival of a first historical event and a last historical event of the historical occurrence.

24. The CS of claim 21, wherein the event pattern is detected by comparing a first plurality of events that are received to the historical pattern data set.

25. The CS of claim 21, wherein the event pattern is detected when the set of events that are received are less than the number of historical events in the historical occurrence.

* * * * *